Figure 1:
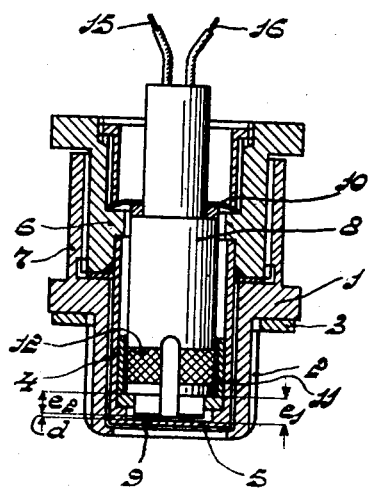

April 3, 1951  M. F. REYNST  2,547,780
CAPACITATIVE PICKUP FOR PRESSURE INDICATORS
Filed Feb. 8, 1947

M. F. REYNST
INVENTOR
BY
AGENT

Patented Apr. 3, 1951

2,547,780

UNITED STATES PATENT OFFICE 2,547,780

CAPACITATIVE PICKUP FOR PRESSURE INDICATORS

Maximilien Félix Reynst, Eindhoven, Netherlands, assignor to Hartford National Bank and Trust Company, Hartford, Conn., as trustee Application February 8, 1947, Serial No. 727,362
In the Netherlands May 16, 1944

Section 1, Public Law 690, August 8, 1946
Patent expires May 16, 1964

3 Claims. (Cl. 175—41.5)

This invention relates to a pressure pick-up having a pressure-dependent capacity, which consists of a diaphragm electrode yielding under the action of the pressure and a counter-electrode, and may be used with advantage more particularly for taking indicator-diagrams of combustion motors or the like.

Capacitative pressure pick-ups of the said kind are known in which, in order to prevent temperature variation of the pick-up capacity, the distance-determining parts of the condenser electrodes, in regard to their length and linear coefficient of expansion, are chosen in such manner that the electrode-distance, and consequently the pick-up capacity, are independent of the temperature.

It has turned out that for the avoidance of great measuring errors devices comprising such pressure pick-ups have to be calibrated while the pressure pick-ups exhibit the working temperature to be expected. A modification of the working temperature necessarily involves a new calibration.

In this way a measuring result independent with respect to temperature and suiting practical purposes is not secured, despite the precautions taken with respect to the temperature variation of the pick-up.

The invention has for its purpose to avoid this drawback.

According to the invention care is taken that the electrode distance of the pick-up capacity is dependent with respect to temperature in such manner that the relative variations of the capacity are independent of the temperature dependency of the elasticity modulus of the diaphragm material.

The invention is based on the realization that the initial temperature dependency of the measuring results are due to two temperature influences which are different in regard to their effect, viz. on the one hand to variations of the distance of the condenser electrodes due to the linear expansion of the distance-determining constructional part of these electrodes, and on the other hand to the variation of the yield of the diaphragm electrode, caused by the given external pressure, as a result of the temperature dependency of the elasticity modulus of the diaphragm material.

The influence of the first-mentioned factor on the pick-up capacity is independent of the pressure acting upon the pick-up. However, the influence of the last-mentioned factor is not independent of this pressure, since in the absence of an overpressure acting upon the pick-up no yield and consequently no variation in yield of the diaphragm occurs.

Consequently, since a pure temperature influence on the one hand and a pressure-dependent temperature influence on the other hand are here dealt with, a simple temperature-dependent compensation measure, such as is taken in common pressure recorders, does not permit the obtainment of a true independency with respect to temperature.

When making use of the invention the aforesaid pressure-dependent temperature influence on the relative capacity variations is compensated for. According to another feature of the invention, the generally strongly negative temperature-dependency of the pick-up capacity then occurring, which is not affected by the pressure acting upon the pick-up, can be offset by a temperature-dependent compensation impedance, more particularly a temperature-dependent condenser, which is exposed to the same ambient temperature as the pressure pick-up. In this case there is no longer a disturbing temperature influence on the measuring results.

The required compensation condenser is preferably incorporated in the pressure pick-up in the immediate proximity of the pick-up capacity.

When making use of the pressure pick-up according to the invention together with a compensation condenser in a bridge circuit arrangement, in which, as is known per se, the pick-up capacity constitutes one of the arms of the bridge and thus, upon pressure variations, modulates the high-frequency feed voltage supplied to the bridge, the pressure pick-up condenser and the compensation condenser preferably together constituting a bridge branch which is located between the feed points of the bridge, the compensation condenser having such a negative temperature dependency that the ratio of the capacity values of pick-up and compensation condenser, within the range of the working temperature to be expected, is independent of the ambient temperature of the pick-up at an optional given external pressure.

Now a static calibration of the pressure indicator associated with the pick-up may take place at any desired temperature, e. g. room temperature. In this case the measuring results obtained by means of such an indicator during operation of a combustion motor need no temperature correction.

Figure 2:
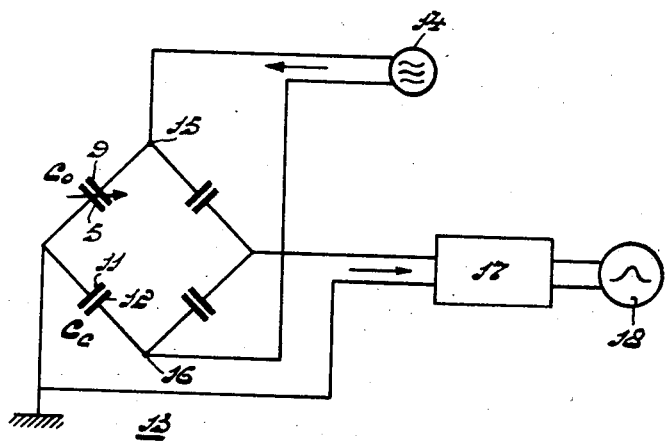

In order that the invention may be more clearly understood and readily carried into effect it will now be described more fully with reference to the accompanying drawing, given by way of example, in which:

Figures 1 and 2 represent respectively a pressure pick-up according to the invention comprising a compensation condenser, and a circuit arrangement comprising such a pressure pick-up.

The pressure pick-up shown in Figure 1 comprises a cylindrical holder 1 which is provided with an external screw-thread 2, by means of which the holder may be secured, with the interposition of a sparking plug ring 3, e. g. in the aperture of the cylinder wall of a combustion motor to be tested. The holder contains a diaphragm case 4, with a certain amount of play whose bottom 5 constitutes the diaphragm-electrode of the pressure-recorder capacity. The diaphragm case is welded to a fastening bush 6 which is screwed into a tubular extension 7 of the holder 1.

The diaphragm case 4 contains a central porcelain rod 8 whose bottom end, which is located opposite the diaphragm electrode 5, carries the counter electrode 9 of the pressure pick-up capacity. The porcelain rod 8 is pressed, by the action of a spring 10, on a re-entrant edge of a metal bush 11 within the diaphragm case, the said bush together with a metal coating 12 on the porcelain rod constituting a condenser. Owing to the difference in linear coefficient of expansion of the bush 11 and the metal coating 12 this condenser has a strongly negative temperature coefficient and may be utilised as a compensation condenser, as will be more fully explained with reference to Fig. 2.

First of all the proportioning of the pressure pick-up according to the invention will be explained.

As stated above the temperature-dependency of the pressure pick-up is due to two factors, viz. on the one hand to the linear expansion of the distance-determining parts of the pressure pick-up electrodes 5 and 9, and on the other hand to the temperature-dependency of the elasticity modulus E of the diaphragm material.

The first-mentioned factor brings about a variation of the distance $d$ between the electrodes 5 and 9. This distance depends upon the dimension in an axial direction of the thickened edge of the bottom of the diaphragm case 4 and upon the dimension in an axial direction of the re-entrant part of the condenser bush 11, these dimensions together having a length $e_1$, and in addition upon the length $e_2$ of the bottom part of the porcelain rod 8.

The electrode distance $d$ being small relatively to $e_1$ and $e_2$ the temperature dependency may be expressed as follows:

$$d_t = d_{20°}\left(1 + \frac{e_1 \cdot \alpha}{d_{20°}} \cdot t°\right) \quad (1)$$

where $d_{20°}$ = electrode distance at room temperature (20° C.)
$t°$ = deviation from room temperature
$d_t$ = electrode distance at (20°+$t°$) C.
$\alpha$ = resulting linear coefficient of expansion of the distance determining parts of the condenser electrodes due to the difference in expansion of porcelain and the metal used for the diaphragm case 4 and the condenser bush 11, for instance iron in which case $\alpha$ = about $5.5 \times 10^{-6}$.

The second factor viz. the temperature dependency of the elasticity modulus E of the diaphragm material is found experimentally and approximated by $$E_{t°} = E_{20°}(1 - \beta t)$$

where $E_{20°}$ = E at room temperature
$t$ = deviation from room temperature (as above)
$E_t$ = E at a temperature (20°+$t°$) C.
$\beta$ = temperature coefficient of the E, e. g. $280 \times 10^{-6}$.

If, due to an external pressure $p$, the yield of the diaphragm amounts to $\Delta d_{20°}$ at room temperature, the yield modified by the variation of E at a temperature (20°+$t°$) C. may, as has been found, be represented to a high degree of approximation by $$\Delta d_t = \Delta d_{20°}(1 + \beta t) \quad (2)$$

The relative capacity variation of the pick-up condenser $$\frac{\Delta C}{C}$$

at room temperature caused by the aforesaid pressure $p$ is, if the yield of the diaphragm is small relative to the electrode distance $d_{20°}$, substantially directly proportional to the relative variation of the electrode distance. So, we have:

$$\frac{\Delta C_{20°}}{C_{20°}} \approx \frac{\Delta d_{20°}}{d_{20°} + \Delta d_{20°}} = \frac{1}{1 + \frac{d_{20°}}{\Delta d_{20°}}} \quad (3)$$

At a temperature deviating by $t°$ C. from room temperature the relative capacity variation would amount to $$\frac{\Delta C_t}{C_t} \approx \frac{\Delta d_t}{d_t + \Delta d_t} = \frac{1}{1 + \frac{d_t}{\Delta d_t}} \quad (4)$$

By substitution of the values, given by the Equations 1 and 2 for $d_t$ and $\Delta d_t$ in the Equation 4 the latter may run as follows:

$$\frac{\Delta C_t}{C_t} = \frac{1}{1 + \frac{d_{20°}\left(1 + \frac{e_1 \alpha}{d_{20°}} \cdot t\right)}{\Delta d_{20°}(1 + \beta t)}} \quad (5)$$

From the Equations 3 and 5 it appears that the relative capacity variation becomes independent with respect to temperature if $$\left(1 + \frac{e_1 \cdot \alpha}{d_{20°}} \cdot t\right) = (1 + \beta t) \quad (6)$$

consequently if $$\alpha \cdot e_1 = \beta \cdot d_{20°} \quad (7)$$

in which case the influence of the temperature dependency of the diaphragm yield upon the relative capacity variation is made up for by the temperature dependency of the electrode distance.

From the Equation 7 it appears that after choosing the electrode distance $d_{20°}$ and choosing the materials to be used for the distance-determining parts of the condenser electrodes, whereby the constants $\alpha$ and $\beta$ are fixed, the said compensation can only be brought about by a judicious choice of the dimension $e_1$ (of course in conjunction with $e_2$). If, for instance, $d_{20°}$ is 0.1 mm. and the constants $\alpha$ and $\beta$ have the aforesaid values, then $$e_1 = \frac{\beta \cdot d_{20°}}{\alpha} = \frac{280 \cdot 10^{-6} \cdot 0.01}{5.5 \cdot 10^{-6}} \approx 0.5 \text{ cm.}$$

Now the relative capacity variation is independent with respect to temperature, it is true, but this holds by no means for the condenser capacity $C_0$ itself, as appears from the temperature dependency of the electrode distance $d$, which follows from the Equation 1 after substitution of the value of $$\frac{e_1 \cdot \alpha}{d_{20°}}$$

given by the Equation 7 viz.

$$d_t = d_{20°}(1+\beta t) \qquad (8)$$

The influence of the strongly negative temperature coefficient of the pick-up capacity $C_0$ thus occurring can be eliminated in an extremely simple manner if, as shown in Figure 2, the pressure-recorder capacity $C_0$ forms part of a bridge circuit 13 and thus, upon pressure variations, brings about the modulation of a high-frequency voltage 14 supplied to the bridge.

In this case use is preferably made of a compensation impedance, more particularly a compensation condenser $C_c$, which is incorporated in the pressure pick-up in the immediate proximity of the pick-up capacity $C_0$, e. g. the compensation condenser 11, 12 in Figure 1, and thus follows the temperature of the pick-up capacity. The pick-up capacity is connected in series with the compensation condenser and this series-connection constitutes a bridge branch located between the feed points of the bridge, the compensation condenser having such a negative dependency with respect to temperature that the ratio of the capacity values of pick-up capacity $C_0$ and compensation capacity $C_c$ within the range of the operating temperature is independent of the ambient temperature of the pick-up at any desired external pressure.

In the indicator circuit 13 of Fig. 2 a source 14 of high frequency is connected across the terminals 15, 16 forming the input diagonal of the bridge. The modulated high-frequency voltage derived from the measuring diagonal of the bridge-arrangement controls after amplification and detection (17) a cathode ray tube 18 in a manner known per se.

It has been found that when making use of the invention it can be ensured that the measuring results obtained by means of the pressure pick-up, within the range of the operating temperature e. g. of from 20° C. to 500° C. for the pick-up, are almost entirely independent with respect to temperature which yields inter alia the very important advantage that the calibration of the pressure indicating device may take place at room temperature.

What I claim is:

1. A capacitive pressure pick-up comprising a longitudinal support member of insulating material having a relatively low thermal coefficient of expansion, a tubular casing located about said support member and spaced therefrom, an electrode arranged on an end face of said support, a metal diaphragm spanning said casing in spaced relationship with said electrode, said electrode and said diaphragm forming a first condenser assembly subjected to a given ambient temperature, said diaphragm having a modulus of elasticity which decreases with increasing temperatures thereof, said casing being subject to thermal expansion such as to counteract the effect of the thermal instability of said modulus of elasticity upon proportional changes in the capacitance of said first condenser due to variations in the pressure upon said diaphragm, an annular electrode arranged on said support member, a portion of said casing concentric with said annular electrode being formed of metal to constitute with said annular electrode a second condenser subjected to an ambient temperature substantially equal to said given ambient temperature, the relative extent of said annular electrode and said concentric portion being such as to maintain a substantially constant capacitance ratio of said two condensers within a given temperature range.

2. A pressure pick-up according to claim 1 in which, within a predetermined temperature range, there exists substantially the relationship $\Delta e = \beta d$, where $d$ represents the spacing between the electrode arranged on said end face and said diaphragm at a given reference temperature within said range, $\Delta e$ represents the increase in said spacing between said electrode arranged on said end face and said diaphragm due to the more rapid thermal expansion of said casing as compared with said support upon a temperature rise of 1° C., and $\beta$ represents the thermal coefficient of said modulus of elasticity with respect to temperature changes measured in degrees centigrade.

3. A capacitive pressure pick-up comprising a substantially cylindrical support member of insulating material having a relatively low thermal coefficient of expansion, a tubular metal casing located about said support member and spaced therefrom, an electrode arranged on an end face of said support, a metal diaphragm spanning said casing in spaced relationship with said electrode, said electrode and said diaphragm forming a first condenser assembly subjected to a given ambient temperature, said diaphragm having a modulus of elasticity which decreases with increasing temperatures thereof, said casing being subject to thermal expansion such as to counteract the effect of the thermal instability of said modulus of elasticity upon proportional changes in the capacitance of said first condenser due to variations in the pressure upon said diaphragm, an annular electrode arranged on said support member, a portion of said metal casing concentric with said annular electrode constituting with said annular electrode a second condenser subjected to an ambient temperature substantially equal to said given ambient temperature, the extent of said annular electrode and the spacing of said annular electrode and said concentric portion being such as to maintain a substantially constant capacitance ratio of said two condensers within a given temperature range.

MAXIMILIEN FÉLIX REYNST.

REFERENCES CITED

The following references are of record in the file of this patent:

UNITED STATES PATENTS

| Number | Name | Date |
|---|---|---|
| 1,939,067 | Legg | Dec. 12, 1933 |
| 2,207,783 | Carlson | July 16, 1940 |
| 2,271,983 | La Rue | Feb. 3, 1942 |
| 2,355,088 | Lavoie | Aug. 8, 1944 |